United States Patent Office 3,050,204
Patented Aug. 21, 1962

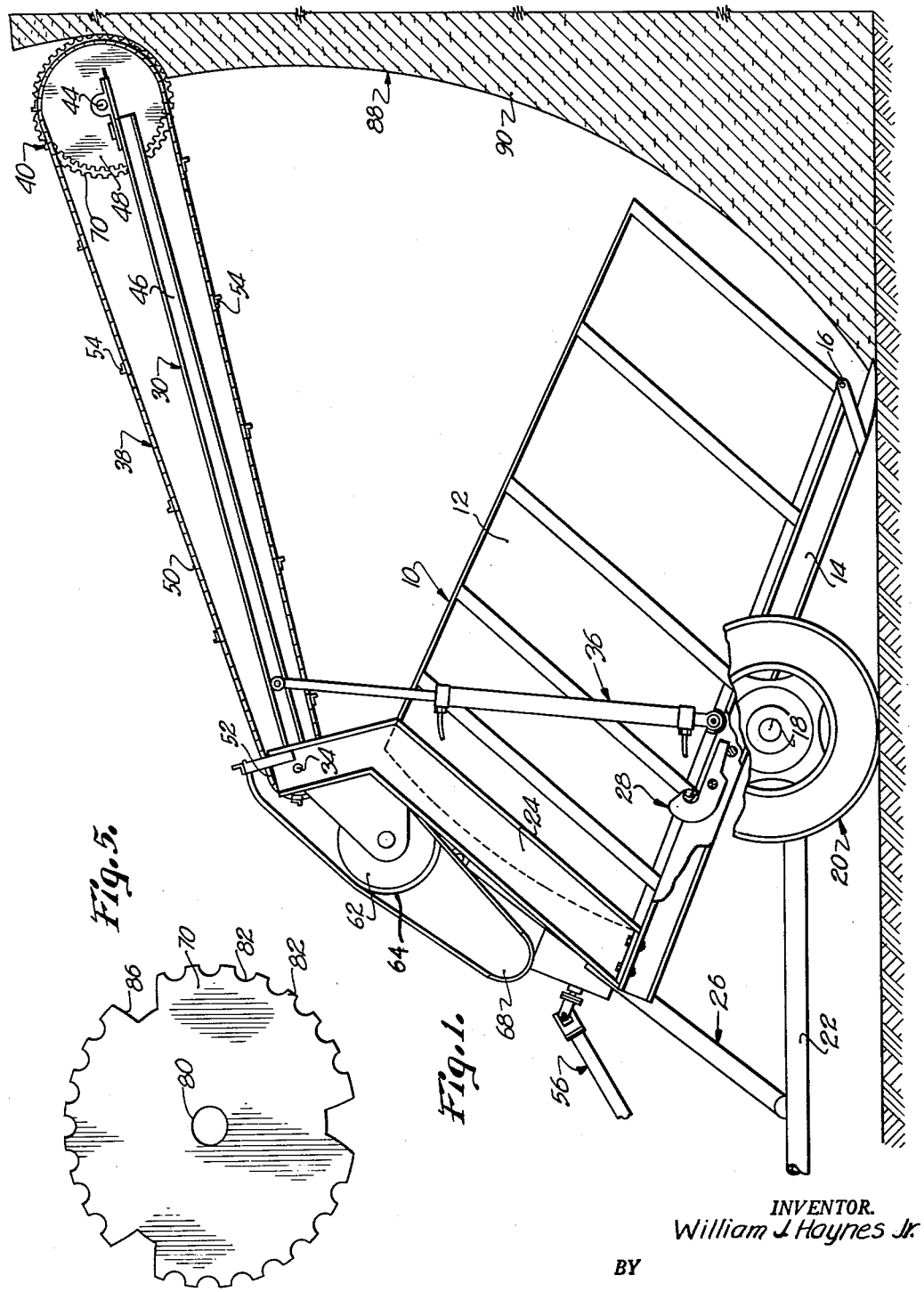

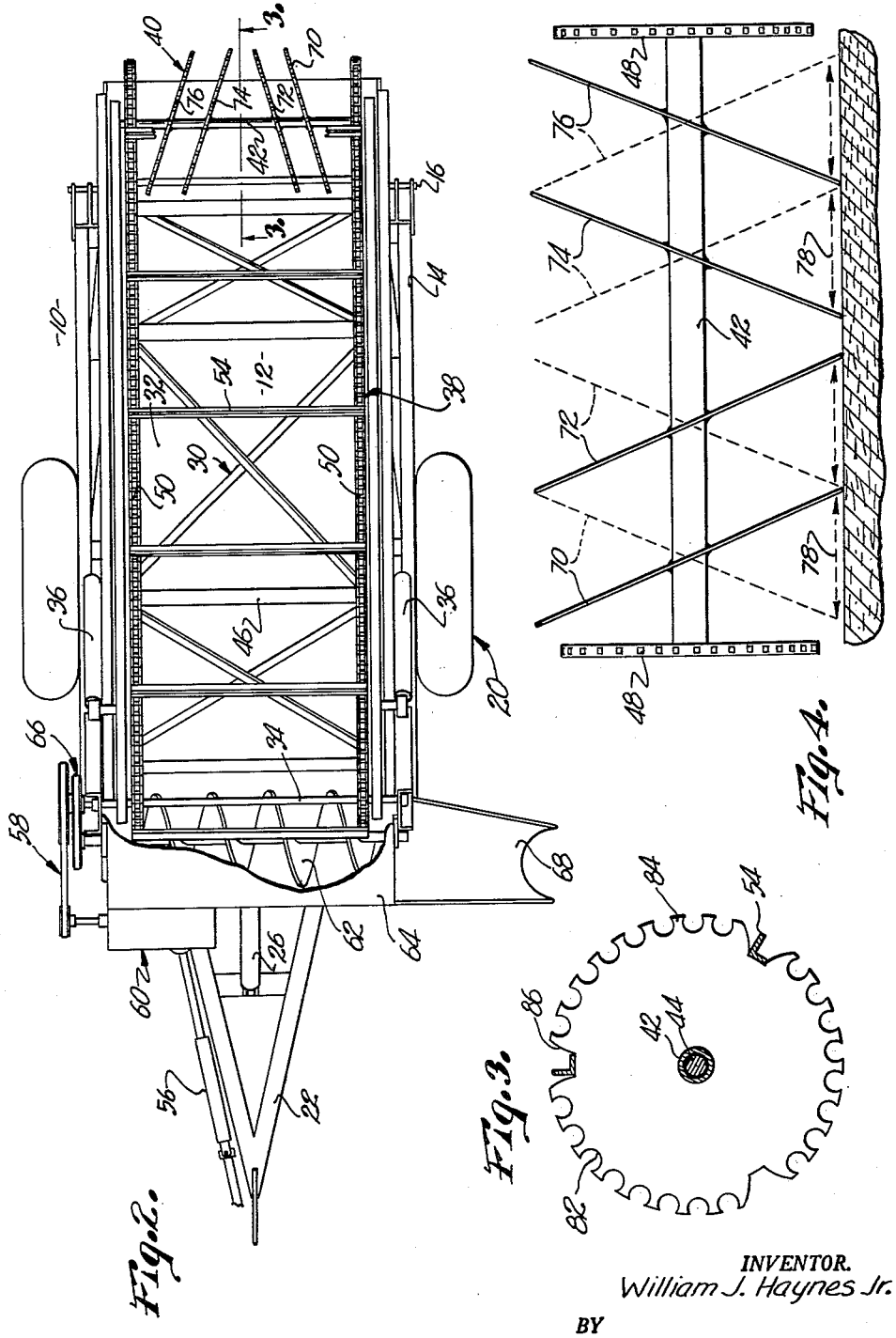

3,050,204
APPARATUS FOR HANDLING ENSILAGE AND SIMILAR PRODUCTS
William J. Haynes, Jr., Kansas City, Mo., assignor to Leavenworth Steel, Inc., Leavenworth, Kans., a corporation of Kansas
Filed Sept. 23, 1959, Ser. No. 841,741
4 Claims. (Cl. 214—508)

This invention relates to material handling equipment especially adapted for use in the loading and unloading of ensilage and has for its primary object the provision in such equipment of multiple action apparatus for dislodging the ensilage from a stack thereof, as for example, in a trench silo, such apparatus being capable of loosening the material from its dense and compact condition into fragments that are easily handled.

Material handling equipment of the kind embodying the improvements of the instant invention is designed to load ensilage into a trailer or the like and to subsequently unload the material at the feed lot in ordinary feed bunks. In this connection, boom structure vertically swingable on the trailer, sweeps along one end wall of the stack of ensilage within the silo to cause the material to gravitate into the trailer. Thereupon, the same boom structure, by virtue of its conveyor mechanism, moves the material in the trailer to a screw conveyor which feeds the ensilage laterally from the trailer to a point of feeding.

Trouble-free operation of machinery of such character requires an initial breaking up of the dense material into relatively small fragments prior to loading. Such results are difficult to attain and it is, therefore, the primary object of the present invention to incorporate with the swingable boom structure and its conveyor means, apparatus that effectively agitates the ensilage to break it up into smaller fragments, all without digging or channelling into the caked and hardened stack.

Another important object of the present invention is to provide apparatus for loosening ensilage preparatory to loading, which apparatus has a multiple action first by virtue of the vertical sweeping movement of the apparatus on one end of the boom mechanism along the end face of the stack of ensilage, secondly, by virtue of the rotative nature of the material loosening unit itself, and finally, because of the way in which such unit is made up of a bank of wabble discs that wipe across the material which they engage.

Another important object of the present invention is to provide loosening discs in the aforementioned unit that are inclined relative to the action of rotation thereof and provided with notched, peripheral edges that effectively shake loose the solid material and thereby fragmentize the same throughout the breadth of the unit, wiping the face of the stack clean as the boom structure descends, all without jamming or lodgment in the material and consequent damage and undue wear in the component parts of the equipment.

Still further, it is an important object of the present invention to combine the material loosening unit with the conveyor means of the boom assembly in a manner to effectively utilize the flights of the conveyor in carrying away the loosened material as it is reduced to a comminuted condition.

In the drawings:

FIG. 1 is a fragmentary, side elevational view of apparatus for handling ensilage and similar materials, showing the same in use during loading and incorporating the multiple action apparatus forming the subject matter of my present invention;

FIG. 2 is a top plan view thereof, parts being broken away for clearness;

FIG. 3 is an enlarged, cross-sectional view through the apparatus per se taken on line 3—3 of FIG. 2;

FIG. 4 is a schematic plan view showing the action of the apparatus on the material which it loosens; and FIG. 5 is an elevational view of one of the discs forming a part of the material loosening unit.

A two-wheeled trailer, broadly designated by the numeral 10 and adapted to be towed by a tractor or other vehicle, is illustrated in FIGS. 1 and 2 of the drawings. Hollow body 12 is open at its top and at its rear end and is carried by chassis 14 for vertical swinging movement with respect to the latter about journal means 16. Chassis 14 is likewise tiltable from a normally horizontal position to the inclined position illustrated in FIG. 1 by virtue of the fact that the chassis 14 is rigid to axle 18 of wheel and axle assembly 20. Tongue unit 22 has a pivotal connection (not shown) with the chassis 14 so that the unit 22 may remain horizontal, as shown in FIG. 1 when the chassis 14 is tilted.

A frame extension 24 is secured in an upright position to the chassis 14 at the forwardmost end of the latter, and a double-acting hydraulic piston and cylinder assembly 26 interconnects the tongue or hitch means 22 with the frame extension 24, serving therefore, as the power means for tilting the chassis 14 and the body 12 carried thereby, to the position shown in FIG. 1. Releasable lock means 28 normally interconnects the body 12 with the chassis 14 to present relative swinging movement about the journal means 16.

A boom assembly, broadly designated by the numeral 30, is carried by the frame extension 24 at the upper end of the latter for vertical swinging movement toward and away from bottom or bed 32 of body 12. The assembly 30 swings about a horizontal shaft 34 on frame extension 24 upon operation of a pair of double-acting hydraulic piston and cylinder assemblies 36 pivotally interconnecting boom assembly 30 with body 12. Boom assembly 30 includes, and therefore supports, an endless conveyor 38 and the multiple action apparatus of the instant invention which is in the nature of a material-loosening unit broadly designated by the numeral 40.

Unit 40 includes a tubular shaft 42 telescoped and freely rotatable with respect to a trunnion 44 that is in turn carried by frame means 46 of assembly 30 at the outermost free end of frame 46 remote from shaft 34. A pair of sprocket wheels 48 rigid to the shaft 42 at its ends, have continuous chains 50 of conveyor 38 trained therearound. The shaft 34 is likewise provided with a pair of sprocket wheels 52 that receive the chains 50. The chains 50 are interconnected by a plurality of spaced-apart flights 54 that are in the nature of elongated angle irons, L-shaped transversely, as best seen in FIG. 3.

The conveyor 38 is driven and the unit 40 thereby rotated clockwise viewing FIG. 1, from shaft 34 to which the sprocket wheels 52 are rigidly attached. Power requirements for such purpose may be obtained from the power take-off of the towing vehicle, an extensible and flexible coupling 56 being provided for such purpose. The details of construction of the operable connection between coupling 56 and shaft 34, form no part of the instant invention, it being noted merely that belt and pulley means 58 connect shaft 34 with coupling 56 through transmission unit 60.

A screw conveyor 62, carried by the frame extension 24 within a trough 64, may likewise be driven from the towing vehicle, belt and pulley means 66 operably connecting screw conveyor 62 with shaft 34. Clutch means (not shown) may be provided so that the screw conveyor 62 may remain stationary during loading of material into the body 12. A chute 68 at the discharge end of trough 64 receives the material from conveyor 62.

The unit 40 includes, in addition to the components above mentioned, a bank of flat discs 70, 72, 74 and 76 rigid to shaft 42 for rotation therewith. The discs are all inclined relative to the axis of rotation of shaft 42, whereby the same wabble during rotation in the manner illustrated by double arrows 78 in FIG. 4. Accordingly, the peripheral edges of the discs are oval, as illustrated in FIG. 5, and opening 80 therein for receiving shaft 42 is similarly shaped.

The flat faces of the discs 70 and 72 are parallel, as are their major axes, and the other bank of discs 74 and 76 likewise have their faces and major axes in parallelism. Thus, as is obvious in FIG. 4 wherein the lengths of the major axes of the discs are illustrated, the bank of discs 70 and 72 slope oppositely to the discs 74 and 76 so as to present a converging diverging relationship, depending upon the point from which the unit 40 is viewed.

Each disc is provided with notches at its periphery, presenting working teeth 84, and each disc is also provided with a number of recesses 86 to accommodate the flights 54 as the latter move around the unit 40.

FIG. 1 illustrates the way in which the unit 40 is moved downwardly along one end face 88 of a stack of compressed ensilage 90 when the assemblies 36 are placed in operation to draw the boom structure 30 in a downward direction. In addition to such downward components of the peripheral edges of the discs 70, 72, 74 and 76 on the ensilage 90, there is a rotative action because of the continual rotation of the unit 40 as driven by shaft 34 through conveyor 38.

During rotation of the discs they do, in fact, wabble laterally, or wipe across the ensilage 90 horizontally, in the manner illustrated in FIG. 4. Thus, instead of the teeth 84 digging or channelling inwardly into the stack 88, they tend to wipe away the material in their back-and-forth rocking motion, reducing the compact material 90 to smaller fragments and permitting the assemblies 36 to lower the boom structure 30 without need for a great amount of power. The fact that the unit 40 clears away the material as it descends, obviates jamming and consequent bending or breakage of the components of the machine.

Simultaneously with the reduction of the dense material into a loosened comminuted condition, the flights 54 of the conveyor 38 continuously move the loosened material away from the unit 40 for gravitation toward the bottom 32 of body 12.

As the material piles up at the rearmost and lowermost ends of the body 12, and as the conveyor 38 descends to the pile of loose ensilage, the latter will be moved toward the forward end of the body 12 by the flights 54, whereupon, when the body 12 is tilted back to a normal horizontal position, the boom assembly 30, resting on the load, will hold the latter in place during transport.

During unloading, the auger 62 is caused to be operated simultaneously with the conveyor 38, the latter moving the material upwardly and forwardly into the trough 64. The assemblies 36 continue to draw the structure 38 downwardly until the same strikes stop means (not shown) within the body 12 whereupon (assuming the latch means 28 to be unlocked), the assemblies 36 tilt the body 12 upwardly about the journal means 16 as an axis. By the time the bed 32 of body 12, and the lower stretch of the conveyor 38 are in parallelism, the material will have all been moved into the trough 64 by the action of conveyor 38.

Having thus described the invention what is claimed as new and desired to be secured by Letters Patent is:

1. Apparatus for loading ensilage from a stack thereof comprising an open top body; a boom assembly pivotally coupled to the body adjacent one end of the boom for vertical swinging movement toward or away from a point adjacent said body; means coupled with the boom for swinging the latter with respect to the body; an endless conveyor supported by the boom and swingable with the latter, said conveyor including a plurality of spaced-apart flights movable through a path of travel fore and aft along the boom; means operably coupled with the conveyor for moving the flights through said path; a material loosening unit carried by the boom adjacent the free end thereof remote from the point of pivot of the boom with respect to the body, said unit including a shaft rotatably secured to the boom and a plurality of oval discs rigid to the shaft, the axis of the discs being inclined relative to the axis of the shaft with the outer peripheral margins of the discs being disposed to engage the face of the stack in wiping relationship thereto for loosening and breaking up said ensilage as the boom is swung toward said point, there being a plurality of notches at the peripheral edge of each disc.

2. Apparatus as set forth in claim 1, wherein the conveyor is looped around the discs whereby the flights pass around said discs during movement through their paths of travel.

3. Apparatus as set forth in claim 2, wherein said discs are provided with recesses in the outer peripheral edges thereof for accommodating the flights as the latter move around the discs during rotation of said shaft.

4. Apparatus as set forth in claim 1, wherein said shaft is operably coupled with the conveyor means for rotation by the latter as the flights are moved through their paths of travel.

References Cited in the file of this patent

UNITED STATES PATENTS

| 2,449,611 | Lupton | Sept. 21, 1948 |
| 2,752,142 | Joy | June 26, 1956 |
| 2,779,452 | Oswalt | Jan. 29, 1957 |
| 2,836,111 | Hobson | May 27, 1958 |
| 2,905,346 | Park et al. | Sept. 22, 1959 |